US007416831B2

(12) United States Patent
Hayashi et al.

(10) Patent No.: US 7,416,831 B2

(45) Date of Patent: Aug. 26, 2008

(54) SUBSTRATE FOR LITHOGRAPHIC PRINTING PLATE PRECURSOR

(75) Inventors: Koji Hayashi, Tatebayashi (JP); Eiji Hayajawa, Utsunomiya (JP); Yasushi Miyamoto, Tatebayashi (JP); Hideo Sakurai, Ageo (JP)

(73) Assignee: Eastman Kodak Company, Rochester, NY (US)

( * ) Notice: Subject to any disclaimer, the term of this patent is extended or adjusted under 35 U.S.C. 154(b) by 390 days.

(21) Appl. No.: 10/922,782

(22) Filed: Aug. 20, 2004

(65) Prior Publication Data

US 2006/0040117 A1 Feb. 23, 2006

(51) Int. Cl.
*G03C 1/492* (2006.01)
*B32B 15/08* (2006.01)

(52) U.S. Cl. .................................... 430/270.1; 428/461

(58) Field of Classification Search ................. 430/272, 430/270.1; 428/461

See application file for complete search history.

(56) References Cited

U.S. PATENT DOCUMENTS

| | | | | |
|---|---|---|---|---|
| 4,153,461 | A | 5/1979 | Berghäuser et al. | |
| 4,458,005 | A | 7/1984 | Mohr et al. | |
| 4,689,272 | A | 8/1987 | Simon et al. | |
| 4,983,497 | A * | 1/1991 | Gilson et al. | 430/272.1 |
| 5,368,974 | A | 11/1994 | Walls et al. | |
| 6,218,075 | B1 | 4/2001 | Kimura et al. | |

FOREIGN PATENT DOCUMENTS

| | | |
|---|---|---|
| EP | 0 307 227 | 3/1989 |
| EP | 1 000 768 A2 | 5/2000 |
| JP | H10-020506 | 1/1998 |
| JP | H11-231509 | 8/1999 |
| JP | 2000-112136 | 4/2000 |

* cited by examiner

*Primary Examiner*—Kevin Kruer
(74) *Attorney, Agent, or Firm*—J. Lanny Tucket

(57) ABSTRACT

Substrates for imageable elements are disclosed. The substrates comprise, in order, an aluminum or aluminum alloy support, a silicate layer, and a layer of interlayer material. The interlayer material is a co-polymer that comprise (1) phosphonic acid groups and/or phosphate groups and (2) acid groups and/or groups that comprise ethylene glycol or polyethylene glycol side chains. Imageable elements that comprise an imageable layer over the interlayer material are useful as lithographic printing plate precursors.

35 Claims, No Drawings

SUBSTRATE FOR LITHOGRAPHIC PRINTING PLATE PRECURSOR

FIELD OF THE INVENTION

The invention relates to lithographic printing. In particular, this invention relates to substrates for lithographic printing plate precursors that comprise an aluminum or aluminum alloy support, a silicate layer, and a layer of interlayer material.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Imaged imageable elements typically require processing in a developer to convert them to lithographic printing plates. Developers are typically aqueous alkaline solutions, which may also contain substantial amounts of organic solvents. Because of their high pH and the presence of organic solvents, disposal of substantial quantities of used developer is expensive and can cause environmental problems.

On-press developable lithographic printing plate precursors can be directly mounted on a press after imaging and developed with ink and/or fountain solution during the initial press operation. These precursors do not require a separate development step before mounting on press. On-press imaging, in which the precursor is both imaged and developed on press, eliminates mounting the precursor in a separate imaging device.

The substrate typically comprises a support of aluminum or an aluminum alloy that has been treated to form a layer of aluminum oxide of its surface. The substrate may also comprise a layer on one or both surfaces to modify the surface characteristics to enhance the hydrophilicity of the surface of the support, to improve adhesion to subsequent layers to the substrate, and to protect the oxide layer during the development process. Although silicates have a good ink scumming properties, that is, they typically do not cause scumming of the printed image, they typically have poor adhesion to the overlying layer, typically the imageable layer. To overcome this deficiency, a diazo polymer is sometimes added to the imageable layer. However, the diazo polymer increases on-press development time and also reduces the shelf life of the lithographic printing plate precursor.

Consequently, a polyvinylphosphonic acid (PVPA) layer is typically used instead of a silicate layer. However, substrates that comprise polyvinylphosphonic acid layers are more prone to scumming than those that comprise silicate layers. Thus, a need exists for substrates for lithographic printing plate precursors, especially for on-press developable lithographic printing plate precursors, that have good adhesion to the overlying layer, do not increase on-press development time, and do not cause scumming of the printed image.

SUMMARY OF THE INVENTION

In one aspect, the invention is a substrate comprising, in order, a support, a silicate layer, and an interlayer; in which:

the support comprises aluminum or an aluminum alloy;

the interlayer comprises an interlayer material;

the interlayer material is a co-polymer comprising K units and L units;

the K units are selected from —[$CH_2C(R^1)C(O)(OCH_2CH(R^5))_mOR^2$]—, —[$CH_2C(R^3)CO_2H$]—, and mixtures thereof;

the L units are selected from —[$CH_2C(R^4)C(O)(OCH_2CH(R^6))_nOP(O)(OH)_2$]—, —[$CH_2CH_2PO(OH)_2$]—, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units.

In another aspect, the invention is an imageable element comprising an imageable layer over the interlayer of the substrate. In another aspect, the invention is a method for forming and image by imaging the imageable element and developing the resulting imaged imageable element. Preferably, the imageable element is thermally imaged, and the imaged imageable element is developed on press with ink and/or fountain solution. In another aspect, the invention is the co-polymer.

DETAILED DESCRIPTION OF THE INVENTION

Unless the context indicates otherwise, in the specification and claims, the terms surfactant, co-polymer, photothermal conversion material, interlayer material, binder, monomer, coating solvent, and similar terms also include mixtures of such materials. Unless otherwise specified, all percentages are percentages by weight. Thermal imaging refers to imaging with a hot body, such as a thermal head, or with infrared radiation.

Interlayer Materials

The interlayer materials are co-polymers that comprise (1) phosphonic acid groups and/or phosphate groups, and (2) acid groups and/or groups that comprise alkylene glycol or polyalkylene glycol side chains. The co-polymers comprise K units and L units. The K units comprise the acid groups and/or the groups that comprise alkylene glycol or polyalkylene glycol side chains. The K units typically comprise about 50 wt % to about 90 wt %, preferably about 55 wt % to about 70 wt % of the co-polymer. The L units comprise the phosphonic acid groups and/or the phosphate groups. The L units typically comprise about 10 wt % to about 50 wt %, preferably about 30 wt % to about 45 wt %, of the co-polymer. Small amounts of units derived from other monomers may be present, but are not required.

The K units are selected from $—[CH_2C(R^1)C(O)(OCH(R^5))_mOR^2]—$, $—[CH_2C(R^3)CO_2H]—$, and mixtures thereof. $R^1$ is hydrogen or methyl, typically methyl. $R^2$ is hydrogen or an alkyl group of one to four carbon atoms. Alkyl groups of one to four carbon atoms include, for example, methyl, ethyl, n-propyl, iso-propyl, n-butyl, sec-butyl, iso-butyl, and t-butyl. $R^2$ is typically hydrogen or methyl. $R^3$ is hydrogen or methyl. $R^5$ is hydrogen, methyl, or chloromethyl ($—CH_2Cl$), typically hydrogen. m is 1 to about 30, typically 1 to about 15.

The L units are selected from $—[CH_2C(R^4)C(O)(OCH_2CH(R^6))_nOP(O)(OH)_2]—$, $—[CH_2CH_2PO(OH)_2]—$, and mixtures thereof. $R^4$ is hydrogen or methyl, typically methyl. $R^6$ is hydrogen, methyl, or chloromethyl, typically hydrogen. n is 1 to about 15, typically 1 to about 8, more typically 1 to about 6.

Preparation of the Interlayer Materials

The interlayer materials may be prepared by free radical polymerization. In a typical preparation, a mixture of monomers, one or more monomers that are the precursor of the K unit and one or more monomers that are the precursor of the L unit are co-polymerized.

Free radical polymerization is well known to those skilled in the art and is described, for example, in Chapters 20 and 21, of *Macromolecules,* Vol. 2, 2nd Ed., H. G. Elias, Plenum, New York, 1984. Useful free radical initiators are peroxides such as benzoyl peroxide, hydroperoxides such as cumyl hydroperoxide and azo compounds such as 2,2'-azobis(isobutyronitrile) (AIBN). Chain transfer agents, such as dodecyl mercaptan, may be used to control the molecular weight of the compound. Suitable solvents for free radical polymerization include liquids that are inert to the reactants and which will not otherwise adversely affect the reaction, for example, water; esters such as ethyl acetate and butyl acetate; ketones such as methyl ethyl ketone, methyl isobutyl ketone, methyl propyl ketone, and acetone; alcohols such as methanol, ethanol, isopropyl alcohol, and butanol; ethers such as dioxane and tetrahydrofuran, and mixtures thereof.

Precursors for the K units include, for example, acrylic acid, methacrylic acid, polyethylene glycol monomethacrylate, polyethylene glycol methyl ether methacrylate, polyethylene glycol ethyl ether methacrylate, polyethylene glycol butyl ether methacrylate, polyethylene glycol monoacrylate, polyethylene glycol methyl ether acrylate, polyethylene glycol ethyl ether acrylate, polyethylene glycol butyl ether acrylate, polypropylene glycol monomethacrylate, polypropylene glycol methyl ether methacrylate, polypropylene glycol ethyl ether methacrylate, polypropylene glycol butyl ether methacrylate, polypropylene glycol monoacrylate, polypropylene glycol methyl ether acrylate, polypropylene glycol ethyl ether acrylate, polypropylene glycol butyl ether acrylate, polyethylene-co-propylene glycol monomethacrylate, polyethylene-co-propylene glycol methyl ether methacrylate, polyethylene-co-propylene glycol ethyl ether methacrylate, polyethylene-co-propylene glycol butyl ether methacrylate, polyethylene-co-propylene glycol monoacrylate, polyethylene-co-propylene glycol methyl ether acrylate, polyethylene-co-propylene glycol ethyl ether acrylate, polyethylene-co-propylene glycol butyl ether acrylate, and mixtures thereof. Mixtures of monomers that have polyalkylene glycol chains of different lengths may also be used either with or without other monomers.

Precursors for the L units include, for example, vinyl phosphonic acid ($(CH_2{=}CHP(O)(OH)_2)$; monomers of the structure: $CH_2{=}C(R^4)C(O)(OCH_2CH(R^6))_nOP(O)(OH)_2$, in which $R^4$ is hydrogen or methyl, $R^6$ is hydrogen, methyl, or chloromethyl and n is 1 to 15, such as ethylene glycol acrylate phosphate, ethylene glycol methacrylate phosphate, polyethylene glycol acrylate phosphates, polyethylene glycol methacrylate phosphates, polypropylene glycol acrylate phosphates, polypropylene glycol methacrylate phosphates, and mixtures thereof. Certain of these monomers, whose structures are shown below, are available under the “Phosmer” tradename.

Phosmer M

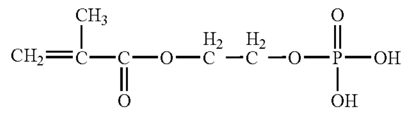

Phosmer CL

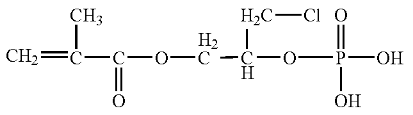

Phosmer PE

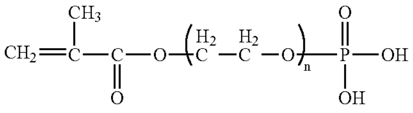

n = 4–5

Phosmer PP

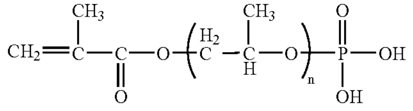

n = 5–6

Although preparation of the interlayer materials has been discussed in terms of monomers that can be used to form the co-polymers, this does not limit the interlayer materials to co-polymers formed by polymerization of the indicated monomers. The co-polymers may be formed by other routes that will be apparent to those skilled in the art, such as by modification of precursor polymers. For example, an interlayer material may be formed by addition of an ethylene glycol side to an appropriate precursor polymer, followed by introduction of the phosphate ester group.

Preparation of the Substrates

The substrate comprises a sheet of aluminum or an aluminum alloy of sufficient thickness to sustain the wear from printing and thin enough to wrap around a cylinder in a printing press, typically about 100 μm to about 600 μm. Before the interlayer is coated on the support, it is cleaned, roughened, and anodized by various methods known in the art. Initially, a degreasing treatment with a surfactant, an organic solvent, or an alkaline water solution is typically administered to the remove oil and grease from the surface of the sheet. Then the surface may be roughened by well known techniques, such as mechanical roughening, for example ball polishing, brush polishing, blast polishing and buff polishing, chemical roughening in which the surface is roughened by selectively dissolving the surface, or electrochemical roughening, or a combination of such chemical, mechanical, and/or electrochemical treatments (multi-graining). Etching of the substrate is performed using hot acidic (such as sulfuric or phosphoric) solutions or alkaline solutions (such as sodium hydroxide or trisodium phosphate mixed with sodium hydroxide). This procedure removes by-product from the graining process to expose the graining structure, at times to amend it by rounding the sharp peaks, and at times to lighten the substrate color for improved contrast to the imaged layer.

Then anodic oxidation is carried out to form a hydrophilic layer of aluminum oxide of the surface, typically a layer of aluminum oxide least 0.3 $g/m^2$ in weight. Various electrolytes can be used for the anodic oxidation, such as sulfuric acid, phosphoric acid, chromic acid, boric acid, citric acid, oxalic acid, or a mixture thereof. Anodic oxidation is performed by passing a current using the support as an anode in an electrolytic solution comprising the electrolyte. The concentration of the electrolyte and the conditions of the anodic oxidization process vary according to the electrolyte used, but typically conditions include an electrolyte concentration of 1 to 80 wt %, the electrolyte temperature of 5° C. to 70° C., current density of 5 to 60 $A/dm^2$, voltage from 1 to 100 V, and electrolysis time from 10 sec to 50 min. Anodic oxidation is disclosed, for example, in Fromson, U.S. Pat. No. 3,280,734, and Chu, U.S. Pat. No. 5,152,158.

Then, the cleaned, roughened, and anodized support is hydrophilized with an alkali metal silicate, such as aqueous potassium silicate, lithium silicate, or, typically, sodium silicate. Hydrophilization is described, for example, in Jewett, U.S. Pat. No. 2,714,066, and Fromson, U.S. Pat. No. 3,181,461, the disclosures of which are incorporated herein by reference. The support is either immersed in or electrolyzed in an aqueous solution of the alkali metal silicate.

Then the interlayer is formed on top of the silicate layer to form the substrate. The interlayer may be formed by dipping the support into 0.01-1% hot solution of the interlayer material in water. Preferably, the solution is at 30 to 80° C., and the support is dipped into the solution for about 3 sec to about 30 sec. More preferably, the solution is at 50-70° C., and the support is dipped into the solution for about 10 sec to about 30 sec. Alternatively, the interlayer material may be coated onto the support by conventional methods, such as spin coating, bar coating, gravure coating, die coating, slot coating, or roller coating.

The back side of the support (i.e., the side opposite the imageable layer) may be coated with an antistatic agent and/or a slipping layer or matte layer to improve handling and "feel" of the imageable element.

Imageable Element

The imageable element comprises an imageable layer over the interlayer of the substrate. Typically, the imageable layer is on the interlayer. The imageable layer comprises an imageable composition. Imageable compositions are well known to those skilled in the art and are disclosed in numerous publications and patents. Any composition used in imageable elements useful as lithographic printing plates, especially on-press developable imageable elements useful as lithographic printing plates, may be used in the imageable elements of the invention.

Although especially useful for on-press developable lithographic printing plate precursors, the is not limited to these imageable elements. Imageable compositions that contain conventional diazo resins may be used. They are described, for example, in Chapter 5 of *Photoreactive Polymers: the Science and Technology of Resists,* A. Reiser, Wiley, New York, 1989, pp. 178-225. These compositions comprise a polymeric diazo resin or a mixture of polymeric diazo resins. A variety of such materials are known in the art. Especially useful polymeric diazo resins are reaction products of diphenylamine-4-diazonium salts, optionally having a methoxy group in the phenyl group bearing the diazo group, with formaldehyde or 4,4-bis-methoxy-methyl diphenyl ether. Dihydrogen phosphate, hexafluorophosphate, hexafluoroantimonate, hexafluoroarsenate, tetrafluoroborate, and aromatic sulfonates such as 4-tolyl-sulfonate or mesitylene sulfonate are particularly suitable counterions for these polymeric diazo resins. These resins are typically used with an added binder, such as is described in Baumann, U.S. Pat. No. 5,700,619, incorporated herein by reference. Binders include, for example, polymeric acetal resins, such as are disclosed in U.S. patent Publication US 2003/0198887. Hybrid systems comprising of a polymeric diazo resins a free radical polymerizable system consisting of photoinitiators and free radical polymerizable components may also be used in the imageable layer.

Negative working imageable compositions that comprise a free radical polymerizable compound, generally known as a monomer, and a free radical generating system (initiator system), can be used in the imageable layer. These compositions are disclosed, for example, in *Photoreactive Polymers: the Science and Technology of Resists,* A. Reiser, Wiley, New York, 1989, pp. 102-177; "Photopolymers: Radiation Curable Imaging Systems," by B. M. Monroe, in *Radiation Curing: Science and Technology,* S. P. Pappas, Ed., Plenum, New York, 1992, pp. 399-440; and "Polymer Imaging" by A. B. Cohen and P. Walker, in *Imaging Processes and Materials,* J. M. Sturge, et al., Eds, Van Nostrand Reinhold, New York, 1989, pp. 226-262. These compositions comprise at least one ethylenically unsaturated compound that undergoes free radical initiated polymerization, generally known as a monomer, a binder, and a free radical generating system. Typical compositions are, by weight, binder(s) 25 to 90%, preferably 45 to 75%; monomer(s), 5 to 60%, preferably, 15 to 50%; photoinitiator system, 0.01 to 10%, preferably 0.1 to 5%; and other ingredients, 0 to 5%, typically 0 to 4%.

Imageable compositions that comprise a QHB-modified monomer are disclosed in Published U.S. Pat. Appln. No. US 2004/0091812, incorporated herein by reference. These compositions comprise a free radical generating system and a QHB-modified free radical polymerizable compound having the structure: $(P)_mB(Q)_n$, in which: Q is a moiety that comprises a QHB unit; P is a moiety that comprises at least one free radical polymerizable group; B is a supporting backbone; and $m \geqq 1$ and $n \geqq 1$. Free radical polymerizable compounds containing the QHB unit are also disclosed in Published U.S. Pat. Appln. No. US 2004/0034190.

A QHB-modified monomer comprises a QHB (quadruple hydrogen bonding) unit, which is capable of forming four or more, typically four, hydrogen bonds with similar or complementary units on other molecules or portions of molecules. Polymeric molecules that, in pairs, form at least four hydrogen bonds with one another are disclosed in Sijbesma, U.S. Pat. No. 6,320,018. The QHB units preferably have an essentially flat, rigid structure. In particular, the unit preferably contains one or more flat six-membered rings. Preferably, the QHB units have two successive donors, followed by two acceptors. Typically, the QHB units are isocytosine units (isocytosine moieties).

A QHB-modified monomer can be prepared by reaction of, for example, an isocytosine such as a 6-alkyl isocytosine, typically 6-methyl isocytosine, with a poly isocyanate to produce an isocytosine/isocyanate adduct. The is reacted with a free radical polymerizable monomer having an isocyanate reactive group, such as —OH or —NH, for example, hydroxyethyl acrylate, hydroxyethyl methacrylate, polyethylene glycol acrylate, polyethylene glycol methacrylate, glycerol dimethacrylate, pentaerythritol triacrylate, pentaerythritol trimethacrylate, dipentaerythritol pentaacrylate, or mixtures thereof, to produce the QHB-modified monomer.

Binders, other monomers, photothermal conversion materials, and other ingredients that are conventional ingredients of imageable compositions, such as dyes and surfactants may also be present in the imageable composition. For example, on-press developability can be enhanced by the use of binders that contain polyethylene glycol side chains. Co-monomers such as dipentaerythritol pentaacrylate, pentaerythritol tetraaacrylate, trimethylolpropane triacrylate, trimethylolpropane trimethacrylate, pentaerythritol tetramethacrylate, glycerol triacrylate, di(trimethylolpropane) tetraacrylate, urethane acrylates obtained by reaction of DESMODUR® N100 with hydroxyethyl acrylate and pentaerythritol triacrylate, and mixtures thereof, may also be used in the imageable composition.

Negative working imageable compositions are also disclosed, for example, in Haley, U.S. Pat. No. 5,372,907; Nguyen, U.S. Pat. No. 5,919,601; Kobayashi, U.S. Pat. No. 5,965,319; Busman, U.S. Pat. No. 5,763,134; WO 00/17711, and U.S. patent application Ser. No. 10/155,696, filed May 24, 2002, the disclosures of which are all incorporated herein by reference. These precursors comprise an imageable layer over a lithographic substrate. The imageable layer comprises a photothermal conversion material, an acid generator, an acid activatable crosslinking agent, and a polymeric binder. The acid generators include precursors that form a Brönsted acid by thermally initiated decomposition. Non-ionic acid generators include haloalkyl-substituted s-triazines, such as 2-phenyl-4,6-bis(trichloromethyl)-s-triazine. Ionic acid generators include onium salts such as diphenyl iodonium chloride, triphenyl sulfonium hexafluoroantimonate, triphenyl sulfonium tetrafluoroborate, 2-methoxy-4-aminophenyl diazonium hexafluorophosphate, 4,4'-dicumyl iodonium p-tolyl sulfate, and 2-methoxy-4-(phenylamino)-benzenediazonium octyl sulfate. Haley, U.S. Pat. No. 5,372,907, discloses a radiation-sensitive composition in which a novolac resin is the polymeric binder and a resole resin is the acid activatable crosslinking agent. Nguyen, U.S. Pat. No. 5,919,601, discloses radiation-sensitive compositions in which the polymeric binder contains reactive pendant groups selected from hydroxy, carboxylic acid, sulfonamide, and alkoxymethylamides; and the polymeric resin is a resole resin, a $C_1$-$C_5$ alkoxymethyl melamine or glycoluril resin, a poly($C_1$-$C_5$-alkoxy-methylstyrene), a poly($C_1$-$C_5$-alkoxymethylacrylamide), a derivative thereof, or a combination thereof.

When the imageable composition is to be thermally imaged, it comprises an absorber, known as a photothermal conversion material. Photothermal conversion materials absorb radiation and convert it to heat. The photothermal conversion material may be, for example, an indoaniline dye, an oxonol dye, a porphyrin derivative, an anthraquinone dye, a merostyryl dye, a pyrylium compound, or a squarylium derivative with the appropriate absorption spectrum and solubility. Dyes, especially dyes with a high extinction coefficient in the range of 750 nm to 1200 nm, are preferred. Absorbing dyes are disclosed in numerous publications, for example, Nagasaka, EP 0,823,327; DeBoer, U.S. Pat. No. 4,973,572; Jandrue, U.S. Pat. No. 5,244,771; and Chapman, U.S. Pat. No. 5,401,618. Examples of useful absorbing dyes include: ADS-830A and ADS-1064 (American Dye Source, Montreal, Canada), EC2117 (FEW, Wolfen, Germany), Cyasorb IR 99 and Cyasorb IR 165 (Glendale Protective Technology), Epolite IV-62B and Epolite III-178 (Epoline), PINA-780 (Allied Signal), SpectralR 830A and SpectralR 840A (Spectra Colors), as wells as IR Dye A and IR Dye B, whose structures are shown below:

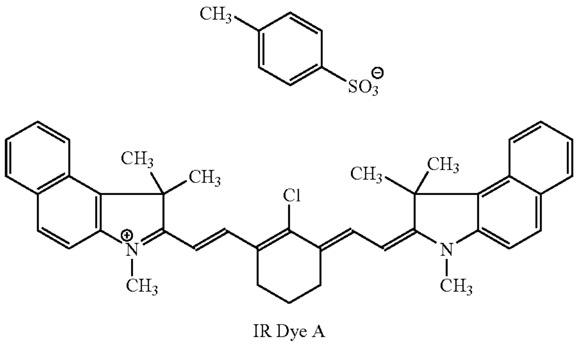

IR Dye A

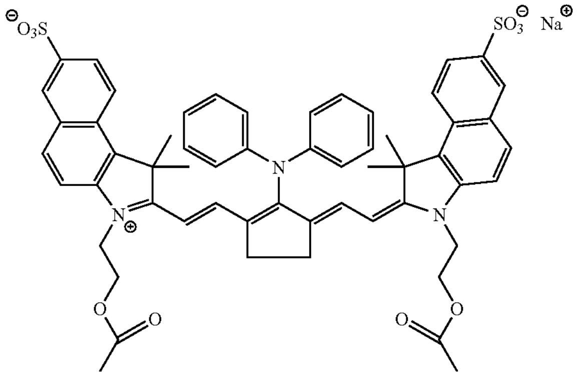

IR Dye B

The amount of absorber in the imageable composition is generally sufficient to provide an optical density of at least 0.05, and preferably, an optical density of from about 0.5 to about 2 at the imaging wavelength. As is well known to those skilled in the art, the amount of absorber required to produce a particular optical density can be determined from the thickness of the layer that contains the absorber and the extinction coefficient of the absorber at the wavelength used for imaging using Beers law. The imageable composition typically comprises about 0.1 to 20% by weight, more preferably about 0.5 to 10% by weight, of the photothermal conversion material, based on the total weight of the composition.

A free radical generating system comprises one or more compounds that generate free radicals when subjected to the appropriate radiation. Thermally sensitive free radical generating systems include, for example, peroxides such as benzoyl peroxide; hydroperoxides such as cumyl hydroperoxide; azo compounds such as AIBN; 2,4,5-triarylimidazolyl dimers (HABIs) such as are disclosed in Dueber, U.S. Pat. No. 4,565,769; onium salts, for example, diazonium salts, iodonium salts, sulfonium salts, phosphonium salts, and pyridinium salts; and mixtures thereof, such diaryliodonium salts and a coinitiator having a carboxylic acid group bonded via a methylene group to a N, O or S group is directly attached to an aromatic ring, which are disclosed in Kawabata, U.S. Pat. No. 5,368,990. The use of sulfonium salts to initiate free radical polymerization is disclosed, for example, in E. Takahashi, et al., *J. Appl. Poly. Sci.,* 91, 589-597 (2004), and E. Takahashi, et al., *J. Poly. Sci.*, Part A: Polymer Chemistry, 41, 3816-3827 (2003). Diaryliodonium salts and triarylsulfonium salts are preferred onium salts.

On-press developable imageable elements are disclosed in U.S. Patent Publication US 2003/0064318 A1, the disclosure of which is incorporated herein by reference. The imageable layer comprises a monomer and a polymeric binder. The polymeric binder is a polymer that comprises a polymer backbone and polyethylene oxide side chains. Other conventional ingredients of imageable layers, such as co-binders, surfactants, and dyes, may also be present.

On-press developable imageable compositions are also disclosed, for example, in Leon, U.S. Pat. Nos. 6,447,978 and 6,365,705, and U.S. patent application Ser. No, 10/747,345, filed Jan. 28, 2004, the disclosure of which is incorporated herein by reference. The imageable layer comprises a photothermal conversion material and a thermally sensitive polymer. The thermally sensitive polymer comprises quaternary ammonium salts of carboxylic acids in which the nitrogen is covalently bound to four alkyl and/or aryl substituents. Optionally, one or more non-carboxylate containing monomers may be included in the polymer.

The imageable elements may be prepared by prepared by applying the imageable layer over the interlayer of the substrate using conventional techniques. The layer may be applied by any conventional method, such as coating or lamination. Typically the ingredients are dispersed or dissolved in a suitable coating solvent, such as water or a mixture of water and an organic solvent such as methanol, ethanol, 1-propanol, 2-propanol, and/or acetone, and the resulting mixture coated by conventional methods, such as spin coating, bar coating, gravure coating, die coating, slot coating, or roller coating. After coating, the resulting layer is dried to remove the coating solvent. The resulting imageable element may be air dried at ambient temperature or at an elevated temperature, such as at about 65° C. for about 20 seconds in an oven. Alternatively, the resulting imageable element may be dried by blowing warm air over the element. The coating weight for the imageable layer is typically about 0.2 $g/m^2$ to about 5.0 $g/m^2$, preferably about 0.7 $g/m^2$ to about 2.5 $g/m^2$.

Imaging and Processing of the Imageable Elements

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618-400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged regions and complementary unimaged regions. Development of the imaged element to form a printing plate converts the latent image to an image by removing one of the imaged regions and the unimaged regions, but not the other of the imaged regions and the unimaged regions, revealing the hydrophilic surface of the underlying substrate.

When the imageable composition comprises a diazo resin or a mixture of diazo resins, it can be developed in a developer, which removes the imaged regions. Useful developers include aqueous alkaline solutions such as those that comprise an alkali metal silicate or metasilicate, such as are described below.

When the imageable composition comprises a free radical polymerizable compound and a free radical generating system, it can be developed in a developer, which removes the unimaged regions. The developer can be an organic solvent, aqueous or semi-aqueous solution, or water. The choice of the developer will depend primarily on the chemical nature of the free radical polymerizable compound and, if present, the binder. Semi-aqueous developers usually contain water and a water miscible organic solvent and an alkaline material. Aqueous developers usually contain water and an alkaline material.

When the imageable composition comprises a photothermal conversion material, an acid generator, an acid activatable crosslinking agent, and a polymeric binder it can be developed in a developer, which removes the unimaged regions. Typically, the imaged imageable element is heated at about 28° C. or less below the fog point at a heating time of two minutes, more preferably about 17° C. or less below the fog point at a heating time of two minutes and most preferably about 8° C. below the fog point before developing. A conventional aqueous alkaline solution can be used as a developer. Useful developers are aqueous solutions having a pH of about 7 or above. These developer typically have a pH between 8 and about 13.5 and comprise at least one alkali metal silicate. Typical commercially available high pH developers include: ProTherm™ Developer, Greenstar™ Developer, Goldstar™ Developer, 4030 Developer, PD-1 Developer, and MX 1710 Developer, all available from Kodak Polychrome Graphics, Norwalk, Conn.

Development is carried out for a long enough time to remove one of the imaged regions and the unimaged regions, but not long enough to remove the other of the imaged regions and the unimaged regions. The developer is typically applied by spraying the imaged element with the developer. Alternatively, development may be carried out in a processor or the imaged element may be brushed with the developer. In each instance, a printing plate is produced. Following development, the printing plate is rinsed with water and dried. Drying may be conveniently carried out by infrared radiators or with hot air.

When the imaged imageable element is developed on press, it is mounted on a press and developed with ink and/or fountain solution during the initial prints. No separate development step is needed before mounting on press. This eliminates the separate development step along with both the processor and developer, thus simplifying the printing process and reducing the amount of expensive equipment required. The imaged imageable element is mounted on the plate cylinder of a lithographic press and developed by rotating the press cylinders and contacting the element with ink and/or fountain solution.

Numerous aqueous fountain solutions are known to those skilled in the art. Fountain solutions are disclosed, for example, in Matsumoto, U.S. Pat. No. 5,720,800; Archer, U.S. Pat. No. 5,523,194; Chase, U.S. Pat. No. 5,279,648; Bondurant, U.S. Pat. Nos. 5,268,025, 5,336,302, and 5,382, 298; Egberg, U.S. Pat. No. 4,865,646; and Daugherty, U.S. Pat. No. 4,604,952. Typical ingredients of aqueous fountain solutions, in addition to water, typically deionized water, include pH buffering systems, such as phosphate and citrate buffers; desensitizing agents, such as dextrin, gum arabic, and sodium carboxymethylcellulose; surfactants and wetting agents, such as aryl and alkyl sulfonates, polyethylene oxides, polypropylene oxides, and polyethylene oxide derivatives of alcohols and phenols; humectants, such as glycerin and sorbitol; low boiling solvents such as ethanol and 2-propanol; sequestrants, such as borax, sodium hexametaphosphate, and salts of ethylenediamine tetraacetic acid; biocides, such as isothiazolinone derivatives; and antifoaming agents.

In conventional wet press lithographic printing, fountain solution and then ink are applied to the printing plate. For presses with integrated inking/dampening system, the ink and fountain solution are emulsified by various press rollers before being transferred to the plate as emulsion of ink and fountain solution. However, in this invention, the ink and fountain solution may be applied in any combination or sequence, as needed for the printing plate.

For on-press imaging, the imageable element is imaged while mounted on a lithographic printing press cylinder, and the imaged imageable element is developed on press with fountain solution during the initial press operation. This is especially suitable for computer-to-press application in which the imageable element (or elements, for multiple color presses) is directly imaged on the plate cylinder according to computer generated digital imaging information and, with minimum or no treatment, directly prints out regular printed sheets. On-press imaging may be carried out on, for example, a Heidelberg QUICKMASTER® DI 46-4 press (Heidelberger Drückmaschinen, Heidelberg, Germany).

INDUSTRIAL APPLICABILITY

The imageable elements can be developed on press using fountain solution as the developer thus avoiding the costs associated with the use of aqueous alkaline developers. Use of the substrates of the invention reduce scumming, improve developablility, improve the adhesion of the imageable layer to the substrate, thus improving yield and reducing waste and downtime.

Once the imageable element has been imaged and developed to form a lithographic printing plate, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

Except where indicated, the indicated percentages are percentages by weight based on the total solids in the coating solution.

| Glossary | |
|---|---|
| AIBN | 2,2'-Azobisisobutyronitrile |
| BYK 336 | Modified dimethyl polysiloxane co-polymer in a 25% xylene/methoxypropyl acetate solution (Byk Chemie, Wallingford, CT USA) |
| CMC | Carboxymethylcellulose (Daicel Chemical, Osaka, Japan) |
| CREO ® Trendsetter 3244 | Commercially available platesetter, operating at a wavelength of 830 nm (Creo Products, Burnaby, BC, Canada) |
| DESMODUR ® N-100 | Solvent-free, aliphatic polyisocyanate resin, trimer of hexamethylene diisocyanate; NCO content, 21.0 +0.2% (Bayer Coatings and Colorants, Pittsburgh, PA, USA) |
| DMAC | Dimethylacetamide |
| IRGACURE ® 250 | Iodonium (4-(2-methylpropyl)phenyl) (4-methylphenyl)-hexafluorophosphate (1-); cationic photoinitiator, 75% solids in propylene carbonate solution (Ciba Specialty Chemicals, Tarrytown, NY USA) |
| IR Dye B | Infrared absorber (Kodak, Rochester, NY, USA) (see structure above) |
| Monomer A | Urethane acrylate comprising QHB (quadruple hydrogen bonding) functional group, 40% solids in DMAC solution (see Example 6) |
| PE350 | Polyethylene glycol methacrylate; MW = 422 (Nihon Yushi) |
| PE90 | Polyethylene glycol monomethacrylate; MW = 174 (Nihon Yushi) |
| PEGMA | Poly(ethyleneglycol)methyl ether methacrylate, 50% wt in water, MW = 2,000 (Aldrich, Milwaukee, WI, USA) |
| PETA | Pentaerythritol triacrylate |
| Phosmer PE | Polyethylene glycol methacrylate phosphate; $CH_2{=}C(CH_3)CO_2(CH_2CH_2O)_nP(O)(OH)_2$, in which n is 4-5 (Uni-chemical) |
| Phosmer M | Ethylene glycol methacrylate phosphate; $CH_2{=}(CH_3)CO_2CH_2CH_2OP(O)(OH)_2$ (Uni-chemical) |
| PMAA | Polymethacrylic acid |
| Polymer A | Allyl methacrylate/PEGMA co-polymer, 10% solids in methyl ethyl ketone solution |
| Polymer B | Emulsion of PEGMA/styrene/acrylonitrile copolymer (10:9:81) in 1-propanol/water, 25% solids |
| SR-399 | Dipentaerythritol pentaacrylate (Sartomer, Exton, PA, USA) |
| VPA | Vinyl phosphonic acid |

Example 1

This example illustrates the synthesis of Co-polymer 1 (P1). Ethyl acetate (90 g) was charged to a 200 mL 4-necked flask under a nitrogen atmosphere and heated to 70° C. A mixture of VPA (14.9 g), PE350 (15.4 g), PE90 (6.6 g), AIBN (1.3 g) and ethyl acetate (25 g) was added dropwise at 70° C. over 4 hr. After the addition was complete, the reaction mixture was kept at 70° C. for an additional 2 hr. 153 g of a solution of Co-polymer 1 was obtained. Gardner viscosity A, non-volatile% was 23.4%

Example 2

This example illustrates the synthesis of Co-polymer 2 (P2). Ethyl acetate (90 g) was charged to a 200 mL 4-necked flask under a nitrogen atmosphere and heated to 70° C. A mixture of Phosmer M (14.9 g), PE350 (15.4 g), PE90 (6.6 g), AIBN (1.3 g) and ethyl acetate (25 g) was added dropwise at 70° C. over 4 hr. After the addition was complete, the reaction mixture was kept 70° C. for an additional 2 hr. 149 g of a solution of Co-polymer 2 solution was obtained. Gardner viscosity A, non-volatile % was 24.1%.

Example 3

This example illustrates the synthesis of Co-polymer 3 (P3). Deionized water (140 g) was charged to a 300 mL 4-necked flask under a nitrogen atmosphere and heated to 70° C. A mixture of Phosmer PE (13.4 g), methacrylic acid (31.2 g), ammonium persulfate (2.6 g) and deionized water (40 g), was added dropwise at 70° C. over 4 hr. After the addition was complete, the reaction mixture was kept 70° C. for an additional 2 hr. 157 g of a solution of Co-polymer 3 solution was obtained. Gardner viscosity A1, non-volatile % was 21.0%

Example 4

This example illustrates the synthesis of Co-polymer 4 (P4). Ethyl acetate (73 g) was charged to a 200 mL 4-necked flask under a nitrogen atmosphere and heated to 70° C. A mixture of VPA (7.8 g), methacrylic acid (24.9 g), AIBN (1.04 g), and ethyl acetate (20 g) was added dropwise at 70° C. over 4 hr. The reaction mixture became cloudy after 1 hr. After the addition was complete, the reaction mixture was kept 70° C. for an additional 2 hr. The reaction mixture was filtered. 29.3 g of Co-polymer 4 was obtained as a white powder.

Comparative Example 1

This example illustrates the synthesis of Comparative Co-polymer 1 (CP1). Ethyl acetate (90 g) was charged to a 200 mL 4-necked flask under a nitrogen atmosphere and heated to 70° C. A mixture of PE350 (36.9 g), AIBN (1.3 g) and ethyl acetate (25 g) was added dropwise at 70° C. over 4 hr. After the addition was complete, the reaction mixture was kept 70° C. for an additional 2 hr. 152 g of a solution of Comparative Co-polymer 1 was obtained. Gardner viscosity A, non-volatile% was 23.3%.

Example 5

This example illustrates preparation and evaluation of imageable elements containing different interlayer materials.

Electrograined and sulfuric acid anodized aluminum substrates were dipped into 3% aqueous sodium silicate solution for 20 sec at 60° C. Then the hydrophilized substrates were then washed with deionized water 60° C. for 20 sec. Solutions (2 g/L in water) of each of the interlayer materials listed in Table 3 were heated to 60° C. The hydrophilized substrates were dipped into the polymer solutions for 20 sec, washed, and dried.

To form the imageable layer, the resulting substrates were coated with the coating solution of shown in Table 1 (S1) or Table 2 (S2) with a #12 rod coater. The resulting imageable elements, consisting of an imageable layer on the substrate, were dried with 100° C., 90 sec.

TABLE 1

| Component | wt % |
|---|---|
| Polymer B | 3.70 |
| Polymer A | 0.39 |
| Monomer A | 0.99 |
| SR-399 | 0.99 |
| IRGACURE ® 250 | 0.32 |

TABLE 1-continued

| Component | wt % |
|---|---|
| IR Dye B | 0.07 |
| BYK-336 | 0.15 |
| Methyl ethyl ketone | 18.68 |
| 1-Propanol | 56.03 |
| Deionized water | 18.68 |
| Total | 100.00 |

TABLE 2

| Component | wt % |
|---|---|
| Polymer B | 3.70 |
| Polymer A | 0.39 |
| Monomer A | 0.99 |
| SR-399 | 0.99 |
| 2-methoxy, 4-diazodiphenylamine hexafluorophosphate | 0.24 |
| IR Dye B | 0.07 |
| BYK-336 | 0.15 |
| Methyl ethyl ketone | 18.7 |
| 2-Methoxyethanol | 56.07 |
| Deionized water | 18.7 |
| Total | 100.00 |

The resulting imageable elements were evaluated for adhesion of the imageable layer to the substrate, on press ink scumming, and developability on press. Imaging was carried out with a CREO® Trendsetter 3244. The drum speed was 90 rpm with a power setting power of 10 w. Imaging energy was 225 mJ/cm$^2$.

The resulting imaged imageable elements were washed with 1% iso-propyl alcohol and then with 1% NA-108W fountain solution (Dainippon Ink and Chemicals, Tokyo, Japan). Unimaged regions of each imaged imageable element were then rubbed with an inked cloth either one, two, three, five, or twenty times. Development on press was determined by the appearance of the regions developed in this manner. To determine scumming, a wetted unimaged region was gently rubbed with the inked cloth. No uptake of ink indicates a good ink scumming property. The unimaged regions were rubbed thoroughly to check for adhesion of the unimaged regions to the substrate. The results are shown in Table 3, in which A is excellent and E is worst.

TABLE 3

(with silicate layer)

| Interlayer material | Coating solution | Adhesion | Ink scumming | Development on press |
|---|---|---|---|---|
| P1 | S1 | A | A | A |
| P2 | S1 | A | A | A |
| P3 | S1 | B | A | A |
| P4 | S1 | C | A | A |
| P1 | S2 | A-B | A | A |
| CP1 | S1 | E | A | A |
| PMAA | S1 | E | A | A |
| CMC | S1 | D | A | A |
| None | S1 | E | A | A |

TABLE 4

| (without silicate layer) | | | | |
|---|---|---|---|---|
| Interlayer material | Coating solution | Adhesion | Ink scumming | Development on press |
| P1 | S1 | D | B | B |
| none | S1 | A | E | C |

Imageable composition S1 showed good adhesion to the substrate for interlayer material P1, P2, P3, and P4, which each contain monomers with either a phosphate or a phosphonic acid group. Adhesion was especially good for interlayer materials P1, P2, and P3. These interlayer materials, which each contain a monomer with a polyethylene glycol side chain, showed excellent adhesion between the imageable layer and the substrate. Imageable composition S2, which contained a diazo compound, had poorer adhesion to the substrate containing interlayer material P1 than imageable composition S1, which did not contain a diazo compound.

Interlayer materials CP1, PMAA, and CMC, and the substrate with no interlayer material (only with silicate) each showed poor adhesion of the imageable layer. The substrate with interlayer material P1, but no silicate, showed poor adhesion to the imageable layer. The substrate with no silicate and no interlayer material had bad ink scumming and poor development on press.

Example 6

This example illustrates preparation of a QHB (quadruple hydrogen bonding)-modified free radical polymerizable compound from DESMODUR® N-100; 2-amino-4-hydroxy-6-methyl pyrimidine (methyl isocytocine); PETA; and 1,4-butanediol in the equivalent ratio 9/2.5/4/2.68 (R-value=OH/NCO=1.02) in DMAC at 40% non-volatiles.

DMAC (1 52.4 g), DESMODUR® N-100 (85.95 g; 0.45 eq) and 2-amino-4-hydroxy-6-methyl pyrimidine (15.64 g; 0.125 eq) (Aldrich, Milwaukee, Wis., USA) were charged in a four-necked 1-L flask fitted with a heating mantle, temperature controller, mechanical stirrer, condenser, nitrogen inlet and pressure equalized funnel. The reaction mixture was allowed to heat slowly to about 87° C. to about 90° C. The % NCO was 13.2 versus 13.44 (theoretical). The viscosity, measured using a Gardner Bubble Viscometer, was <50 cps.

The reaction mixture was cooled to 40° C. and pre-mixture of DMAC (135.6 g), PETA (89.05 g; 0.2 eq), hydroquinone (0.38 g), dibutyltin dilaurate (0.3 g) were added over 30 min. The temperature was slowly raised to 60° C. while additional dibutyltin dilaurate (0.3 g) was added. Five hours later, the % NCO was 2.8 versus 2.74 (theoretical) and viscosity was <50 cps.

The reaction mixture was cooled to 50° C. and pre-mixture of DMAC (9.0 g), 1,4-butane diol (6.03 g; 0.1338 eq), and dibutyltin dilaurate (0.3 g) were added over 30 min. Five hours later, the % NCO was 0.0 based on titration and FT-IR (2275 $cm^{-1}$). The viscosity, measured using a Gardner Bubble Viscometer, was 130 cPs. The % non-volatiles were 40%. The reaction mixture is clear liquid at room temperature. The next day, the room temperature viscosity, measured using a Gardner Bubble Viscometer, was 270 cPs and remained the same at room temperature.

Having described the invention, we now claim the following and their equivalents.

What is claimed is:

1. A co-polymer comprising K units and L units:

the K units are selected from —$[CH_2C(R^1)C(O)(OCH_2CH(R^5))_mOR^2]$—, —$[CH_2C(R^3)CO_2H]$—, and mixtures thereof;

the L units are selected from —$[CH_2C(R^4C(O)(OCH_2CH(R^6))_nOP(O)(OH)_2]$—, —$[CH_2CH_2PO(OH)_2]$—, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units.

2. The co-polymer of claim 1 in which:

the k units are selected from —$[CH_2C(R^1C(O)(OCH_2CH(R^5))_mOR^2]$—;

the L units are selected from —$[CH_2C(R^4)C(O)(OCH_2CH(R^6))_nOP(O)(OH)_2]$—; and $R^1$ is methyl; $R^2$ is hydrogen or methyl; $R^4$ is methyl; $R^5$ is hydrogen; and $R^6$ is hydrogen.

3. The co-polymer of claim 2 in which the co-polymer comprises about 55 wt % to 70 wt % of the K units and about 30 wt % to about 45 wt % of the L units, m is 1 to about 15, and n is 1 to about 8.

4. A substrate comprising, in order, a support, a silicate layer, and an interlayer, in which:

the support comprises aluminum or an aluminum alloy;

the interlayer comprises an interlayer material;

the interlayer material is a co-polymer comprising K units and L units;

the K units are selected from —$[CH_2C(R^1)C(O)(OCH_2CH(R^5))_mOR^2]$—, and mixtures thereof;

the L units are selected from —$[CH_2C(R^4)C(O)(OCH_2CH(R^6))_nOP(O)(OH)_2]$—, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units.

5. The substrate of claim 4 in which the K units comprise 55 wt % to 70 wt % of the co-polymer and the L units comprise about 30 wt % to 45 wt %, of the co-polymer.

6. The substrate of claim 4 in which $R^1$ is methyl; $R^2$ is hydrogen or methyl; $R^4$ is methyl; $R^5$ is hydrogen; and $R^6$ is hydrogen.

7. The substrate of claim 6 in which the co-polymer comprises about 55 wt % to 70 wt % of the K units and about 30 wt % to about 45 wt % of the L units.

8. The substrate of claim 7 in which m is 1 to about 15 and n is 1 to about 8.

9. An imageable element comprising:

a substrate comprising, in order, a support, a silicate layer, and an interlayer; and an imageable layer over the interlayer;

in which:

the imageable layer comprises an imageable composition;

the support comprises aluminum or an aluminum alloy;

the interlayer comprises an interlayer material;

the interlayer material is a co-polymer comprising K units and L units:

the K units are selected from $—[CH_2C(R^1)C(O)OCH_2CH(R^5))_mOR^2]—$, and mixtures thereof;

the L units are selected from $—[CH_2C(R^4)C(O)(OCH_2CH(R^6))_nOP(O)(OH)_2]—$, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units.

10. The imageable element of claim 9 in which the co-polymer comprises about 55 wt % to 70 wt % of the K units and about 30 wt % to about 45 wt % of the L units.

11. The imageable element of claim 9 in which: $R^1$ is methyl; $R^2$ is hydrogen or methyl; $R^4$ is methyl; $R^5$ is hydrogen; and $R^6$ is hydrogen.

12. The imageable element of claim 11 in which the co-polymer comprises about 55 wt % to 70 wt % of the K units and about 30 wt % to about 45 wt % of the L units.

13. The imageable element of claim 12 in which m is 1 to about 15 and n is 1 to about 8.

14. The imageable element of claim 9 in which the imageable composition is a negative working imageable composition that comprises a monomer and a free radical generating system.

15. The imageable element of claim 14 in which the imageable composition additionally comprises a binder.

16. The imageable element of claim 15 in which the co-polymer comprises about 55 wt % to 70 wt % of the K units and about 30 wt % to about 45 wt % of the L units.

17. The element of claim 16 in which the binder is a co-polymer that comprises polyethylene oxide side chains.

18. The imageable element of claim 9 in which:

$R^1$ is methyl; $R^2$ is hydrogen or methyl; $R^4$ is methyl; $R^5$ is hydrogen; and $R^6$ is hydrogen; and m is 1 about 15 and n is 1 to about 8.

19. The imageable element of claim 9 in which the imageable layer comprises a polymeric diazo resin or a mixture of polymeric diazo resins.

20. The imageable element of claim 19 in which the co-polymer comprises about 55 wt % to 70 wt % of the K units and about 30 wt % to about 45 wt % of the L units.

21. The imageable element of claim 9 in which the imageable layer comprises a photothermal conversion material, an acid generator, an acid activatable crosslinking agent, and a polymeric binder.

22. The imageable element of claim 21 in which:

$R^1$ is methyl; $R^2$ is hydrogen or methyl; $R^4$ is methyl; $R^5$ is hydrogen; and $R^6$ is hydrogen; the co-polymer comprises about 55 wt % to 70 wt % of the K units and about 30 wt % to about 45 wt % of the L units; and m is 1 to about 15 and n is 1 to about 8.

23. A method for forming an image, the method comprising the steps of:

providing an imageable element comprising:

a substrate comprising, in order, a support, a silicate layer, and an interlayer, and an imageable layer over the interlayer;

thermally imaging the imageable element and forming an imaged imageable element comprising imaged regions and complementary unimaged regions in the imageable layer;

developing the imaged imageable element and removing one of the imaged regions and the unimaged regions;

in which:

the imageable layer comprises an imageable composition;

the support comprises aluminum or an aluminum alloy;

the interlayer comprises an interlayer material;

the interlayer material is a co-polymer comprising K units and L units;

the K units are selected from $—[CH_2C(R^1)C(O)(OCH_2CH(R^5))_mOR^2]—$, and mixtures thereof;

the L units are selected from $—[CH_2C(R^4)C(O)(OCH_2CH(R^6)_nOP(O)(OH)_2]—$, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units.

24. The method of claim 23 in which developing is carried out with ink and fountain solution.

25. The method of claim 24 in which the imageable composition is a negative working imageable composition that comprises a monomer and a free radical generating system, and developing removes the unimaged regions.

26. The method of claim 25 in which the imageable composition additionally comprises a binder.

27. The method of claim 26 in which:

$R^1$ is methyl; $R^2$ is hydrogen or methyl; $R^4$ is methyl; $R^5$ is hydrogen; and $R^6$ is hydrogen;

the co-polymer comprises about 55 wt % to 70 wt % of the K units and about 30 wt % to about 45 wt % of the L units; and m is 1 to about 15 and n is 1 to about 8.

28. The method of claim 26 in which $R^1$ is methyl; $R^2$ is hydrogen or methyl; $R^5$ is hydrogen or methyl; the co-polymer comprises about 55 wt % to 70 wt % of the K units and about 30 wt % to about 45 wt % of the L units; and m is 1 to about 15 and n is 1 to about 8.

29. The method of claim 23 in which the imageable layer comprises a polymeric diazo resin or a mixture of polymeric diazo resins, and developing removes; the imaged regions.

30. The method of claim 29 in which:

$R^1$ is methyl; $R^2$ is hydrogen or methyl; $R^4$ is methyl; $R^5$ is hydrogen; and $R^6$ is hydrogen;

the co-polymer comprises about 55 wt % to 70 wt % of the K units and about 30 wt % to about 45 wt % of the L units; and m is 1 about 15 and n is 1 to about 8.

31. The method of claim 29 in which in which $R^1$ is methyl; $R^2$ is hydrogen or methyl; $R^5$ is hydrogen or methyl; the co-polymer comprises about 55 wt % to 70 wt % of the K units and about 30 wt % to about 45 wt % of the L units; and m is 1 to about 15 and n is 1 to about 8.

32. The method of claim 23 in which the imageable layer comprises a photothermal conversion material, an acid generator, an acid activatable crosslinking agent, and a polymeric binder, and developing removes the unimaged regions.

33. The method of claim 32 in which:

$R^1$ methyl; $R^2$ is hydrogen or methyl; $R^4$ is methyl; $R^5$ is hydrogen; and $R^6$ is hydrogen; the co-polymer comprises about 55 wt % to 70 wt % of the K units and about 30 wt % to about 45 wt % of the L units; and is 1 to about 15 and n is 1 to about 8.

34. The method of claim 32 in which $R^1$ is methyl; $R^2$ is hydrogen or methyl; $R^5$ is hydrogen or methyl; the co-polymer comprises about 55 wt % to 70 wt % of the K units and about 30 wt % to about 45 wt % of the L units; and m is 1 to about 15 and n is 1 to about 8.

35. An imageable element comprising:

a substrate comprising, in order, a support, a silicate layer, and an interlayer; and an imageable layer over the interlayer;

in which:

the imageable layer comprises an imageable composition;

the support comprises aluminum or an aluminum alloy;

the interlayer comprises an interlayer material;

the interlayer material is a co-polymer comprising K units and L units:

the K units are selected from —$[CH_2C(R^1)C(O)(OCH_2CH(R^5))_mOR^2]$—, —$[CH_2C(R^3)CO_2H]$—, and mixtures thereof;

the L units are selected from —$[CH_2C(R^4)C(O)(OCH_2CH(R^6))_nOP(O)(OH)_2]$—, —$[CH_2CH_2PO(OH)_2]$—, and mixtures thereof;

$R^1$ is hydrogen or methyl; $R^2$ is hydrogen or an alkyl group of one to four carbon atoms; $R^3$ is hydrogen or methyl; $R^4$ is hydrogen or methyl; and $R^5$ and $R^6$ are each independently hydrogen, methyl, or chloromethyl; m is 1 to about 30; and n is 1 to about 15; and the co-polymer comprises about 50 wt % to 90 wt % of the K units and about 10 wt % to about 50 wt % of the L units, wherein said imageable element is on-press developable using a lithographic ink, fountain solution, or both.

* * * * *